Oct. 31, 1967 A. L. KEMPER 3,350,650

NOISE AND AUDIO CONTROLLED SQUELCH CIRCUIT

Filed June 17, 1964 2 Sheets-Sheet 1

INVENTOR.
ARTHUR L. KEMPER

BY *Moody and Kintzinger*
ATTORNEYS

INVENTOR.
ARTHUR L. KEMPER
BY Woody and Kintzinger
ATTORNEYS

United States Patent Office 3,350,650

Patented Oct. 31, 1967

3,350,650

NOISE AND AUDIO CONTROLLED SQUELCH CIRCUIT

Arthur L. Kemper, Marion, Iowa, assignor to Collins Radio Company, Cedar Rapids, Iowa, a corporation of Iowa Filed June 17, 1964, Ser. No. 375,887
14 Claims. (Cl. 325—478)

ABSTRACT OF THE DISCLOSURE

A squelch system operative from two sources of information: the presence of noise, varying inversely with the degree of modulation, and the syllabic rate characteristic of speech. The two items of information are passed within the limits of the demodulator IF passed to the audio output line of the receiver with a squelch circuit syllabic rate channel developing a negative going squelch control voltage and a noise channel developing positive going voltage. These voltages are summed for controlling squelch. Further, the squelch system has extremely fast attack in removal of squelch with the start of audio in action through the syllabic rate channel, and even with relatively slow release from the audio state to the squelched condition of operation.

Figure 1:
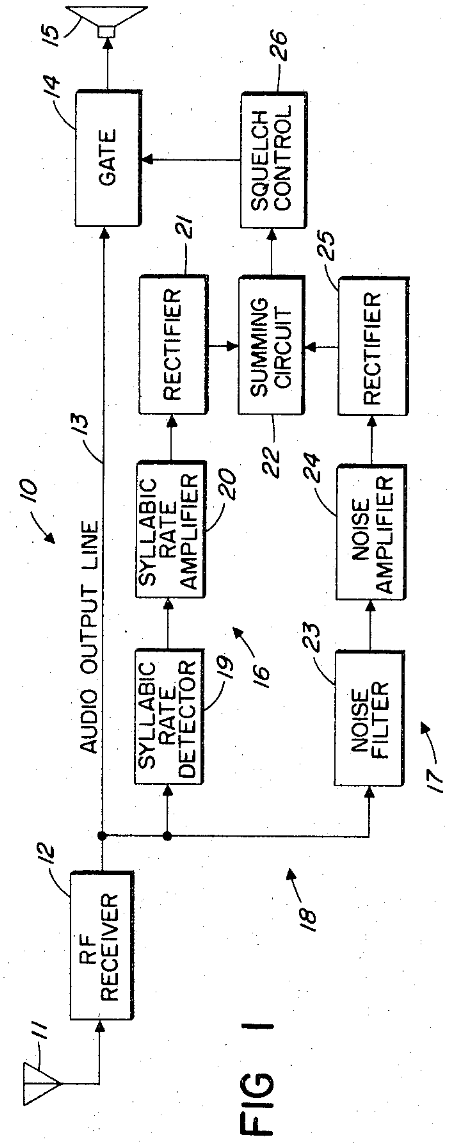

This invention relates in general to squelch control circuits and in particular to a combination squelch circuit operating a common squelch gate regardless of whether the received signal is AM or FM or a single sideband system where there is no carrier present to quiet the receiver. In this squelch circuit, which is particularly useful with single sideband signal receivers, the syllabic rate characteristic of speech generates a negative control voltage and the presence of noise generates a positive control voltage, with these voltages singly or in combination controlling squelch operation.

Squelch circuits used in conjunction with AM or FM receivers have been in existence for many years and can be made to perform quite satisfactorily. Operation of most of these circuits is based on the fact that in the presence of a carrier, the overall receiver noise is greatly attenuated by AVC action (or AGC) driving one or more IF and/or RF amplifier stages near the respective cut off regions, thereby substantially reducing receiver gain. Squelch action with such systems has in many instances been obtained by detecting the receiver carrier and/or noise and using this information to control an audio gate in the receiver output circuit. With a single sideband transmitting system, a received single sideband signal is characterized by the absence of a carrier or a very weak carrier under keyed down, no modulation conditions, and therefore the information available in received signals and relied upon for squelch operation is not available to operate a squelch control gate. However, it should be noted that in the presence of modulation in a received single sideband signal the receiver noise is attenuated but such noise reduction varies at the modulation rate.

It is, therefore, a principal object of this invention to provide an improved squelch system having an operation based on two sources of information: presence of noise, varying inversely with the degree of modulation, and the syllabic rate characteristic of speech.

Another object is to provide a squelch system having an extremely fast attack, and removal of squelch at the start of audio, even before a syllabic rate voltage is developed.

A further object is to provide, in a squelch system having such an extremely fast attack time, a relatively slow release time from the audio state to the squelched condition.

Features of this invention useful in accomplishing the above objects with such a squelch system include, an AGC system equipped single sideband receiver or alternately an AM or FM receiver equipped with an AGC system, an audio output line, a gate in the audio output line, and the squelch circuit. IF passband, passed to the audio output line from receivers used with the new squelch, would have a cutoff, for example, at approximately 7.5 kc. The squelch circuit has a syllabic rate channel developing a negative going squelch controlling voltage from the syllabic rate content of speech beneath approximately 25 c.p.s., and a noise channel developed positive going voltage output for controlling squelch. The positive going voltage output of the noise channel is developed from signal content in the audio output line passed to the noise channel through a relatively narrow passband input filter passing frequency content centered at approximately 6,000 c.p.s. near but below the IF passband cutoff frequency of the receiver. The squelch system has circuitry for developing an extremely fast attack in removal of squelch at the start of audio acting through the syllabic rate channel, even before a syllabic rate voltage is developed and still, in squelch output control circuitry, provides for relatively slow release from the audio state to the squelched condition of operation.

A specific embodiment representing what is presently regarded as the best mode of carrying out the invention is illustrated in the accompanying drawings.

Figure 2:
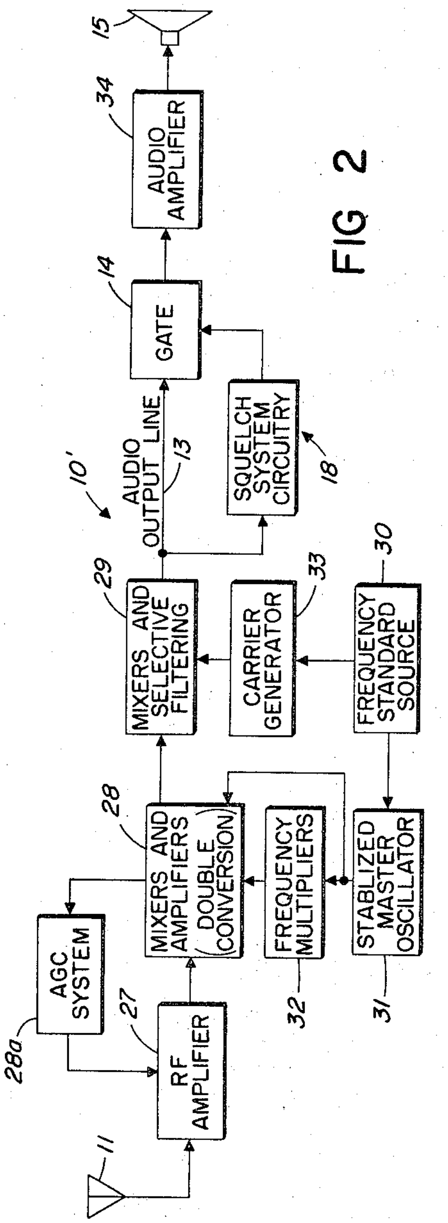
Figure 3:
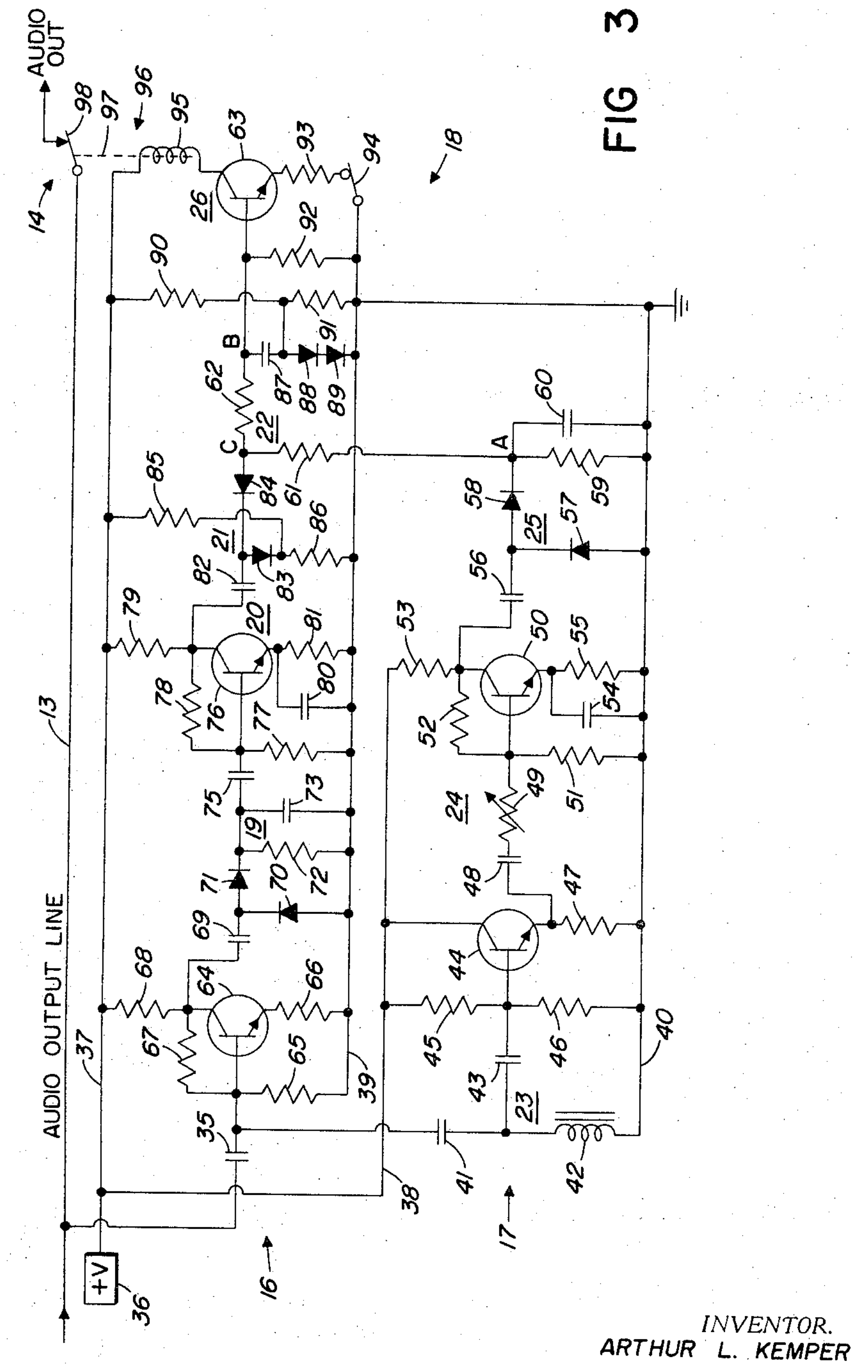

In the drawings:

FIGURE 1 represents a block diagram of a radio receiver having AGC equipped with the new noise and audio controlled squelch circuit;

FIGURE 2, a block diagram of a single sideband receiver equipped with the new noise and audio controlled squelch circuit; and FIGURE 3, a detailed schematic of the noise and audio controlled squelch circuit used with the receivers of FIGURES 1 and 2.

Referring to the drawings:

The radio receiver 10 of FIGURE 1 receives an RF signal from antenna 11. The RF signal is fed to an automatic gain control (AGC) equipped RF receiver 12 which may be an AM or FM receiver or a single sideband receiver. In any event, receiver 12 provides an audio output throuh audio output line 13 to a squelch circuit controlled gate 14 and through gate 14 to speaker 15. The audio output of receiver 12 is also applied as an input to a syllabic rate path 16 and also as an input to a noise path 17 of squelch system circuit 18. The audio input to the syllabic rate path 16 is fed to syllabic rate detector 19 the output of which is applied as a syllabic rate input to and through syllabic rate amplifier 20 to rectifier 21 from which rectified output is applied as an input to summing circuit 22. The audio input to noise path 17 is fed to noise filter 23 from which noise passed is amplified through noise amplifier 24 and applied as an input to rectifier 25, the output from which is applied as an additional input to summing circuit 22. The resulting output of summing circuit 22 is applied as a controlling input to squelch control circuit 26 from which an output is applied as a controlling input to gate 14.

Referring also to FIGURE 2, squelch circuit 18, duplicating the circuit elements in the FIGURE 1 embodiment, but illustrated merely as a single block in FIGURE 2, is shown in its preferred use in a single sideband receiver 10' where the squelch system is particularly advantageously employed. In this embodiment, components substantially the same as in the FIGURE 1 embodiment are numbered the same as a matter of convenience. The RF signal from antenna 11 is fed through RF amplifier 27 to a mixers and amplifier double conversion circuit 28 to develop an output passed to a mixers and selective filtering circuit section 29. An AGC circuit 28*a* provides for applying automatic gain control signal voltage from mixers and amplifier double conversion circuit 28 to RF amplifier 27 in a conventional manner. A frequency standard source 30 is provided in this single sideband receiver from which one output is applied to a stabilized master oscillator 31. The output of stabilized master oscillator 31 is separated into two paths, one as an input to frequency multipliers circuit 32 and the other as an input directly to the mixers and amplifiers double conversion circuit 28. The output of the frequency multipliers circuit 32 is also applied as an additional input to the mixers and amplifiers double conversion circuit 28. Another output connection of the frequency standard source is the means of providing a frequency standard input signal to carrier generator 33, from which a frequency reinsertion carrier signal is fed as an additional input to mixers and selective filtering circuit 29.

The mixers and selective filtering circuit 29 provides an audio output through audio output line 13 to a squelch circuit controlled gate 14 and through gate 14, when not activated for squelching, to and through audio amplifier 34 to speaker 15. The audio output of mixers and selective filtering circuit 29 is also applied as an input to squelch system circuit 18 for developing squelch control voltages applied to gate 14. Gate 14 may be a solid state squelch voltage controlled switch circuit or a relay controlled squelch voltage operated relay switch, as the case may be.

Referring now to FIGURE 3, the squelch system circuit 18 is shown to be provided with an audio output line 13 input connection through capacitor 35 to the syllabic rate path circuit 16 and the noise path circuit 17. Both the syllabic rate path circuit and the noise path circuit 17 are supplied a positive voltage from voltage supply source 36 through lines 37 and 38, respectively, and both channels are also equipped with grounded connection lines 39 and 40, respectively. The input to noise path circuit 17 is passed through capacitor 41 of a narrow passband or high pass filter also including coil 42 serially connected between capacitor 41 and ground line 40. The common junction of capacitor 41 and coil 42 is connected through capacitor 43 to the base of NPN transistor 44. The common junction of capacitor 43 and the base of transistor 44 is connected through resistor 45 to the positive voltage supply line 38 and through resistor 46 to the ground line 40. The collector of transistor 44 is connected to the positive voltage supply line 38 while the emitter is connected through resistor 47 to ground line 40.

The common junction of the emitter of NPN transistor 44 and resistor 47 is serially connected through capacitor 48 and variable resistor 49 to the base of NPN transistor 50. The common junction of variable resistor 49 and the base of transistor 50 is connected through resistor 51 to ground line 40 and also through serially connected resistors 52 and 53 to the positive voltage supply line 38. The emitter of transistor 50 is connected through capacitor 54 and resistor 55, in parallel, to ground line 40. The collector of transistor 50 is connected to the common junction of resistors 52 and 53 and also through capacitor 56 to the common junction of diodes 57 and 58. Diode 57 is connected anode to ground line 40 and cathode to the common junction of capacitor 56 and the anode of diode 58. The cathode of diode 58 is connected through resistor 59 and capacitor 60, in parallel, to ground line 40 and also in an output connection serially through isolation resistor 61 and resistor 62 to the base of squelch control NPN transistor 63.

The input connection from audio output line 13 through capacitor 35 to the syllabic rate path circuit 16 is to the base of NPN transistor 64. The common junction of capacitor 35 and the base of transistor 64 is connected through resistor 65 to ground line 39 and the emitter of transistor 64 is connected through resistor 66 to ground line 39. The common junction of capacitor 35 and the base of transistor 64 is also connected through serially connected resistors 67 and 68 to the positive voltage supply line 37. The collector of transistor 64 is connected to the common junction of resistors 67 and 68 and also through capacitor 69 to the common junction of diodes 70 and 71. Diode 70 is connected anode to ground line 39 and cathode to the common junction of capacitor 69 and the anode of diode 71. The cathode of diode 71 is connected through resistor 72 and capacitor 73, in parallel, to ground line 39. The resulting D-C output of the diode 70 and diode 71 rectifier and voltage doubler is filtered for audio frequencies by capacitor 73 and applied through capacitor 75 to the base of NPN transistor 76. The common junction of capacitor 75 and the base of transistor 76 is connected through resistor 77 to ground line 39 and also through serially connected resistors 78 and 79 to the positive voltage supply line 37. The emitter of transistor 76 is connected through capacitor 80 and resistor 81, in parallel, to ground line 39.

The collector of transistor 76 is connected to the common junction of resistors 78 and 79 and also through capacitor 82 to the common junction of diodes 83 and 84. Diode 83 is connected anode to the common junction of capacitor 82 and the cathode of diode 84, and the cathode of diode 83 is connected to the common junction of resistors 85 and 86 serially connected between the positive voltage supply line 37 and ground line 39. Any low frequency amplified signal out of the collector of transistor 76 is rectified and voltage doubled through the diodes 83 and 84 forming rectifier and voltage doubler 21 to provide an output voltage, as appropriate, out of the anode of diode 84. Any output voltage appearing at the anode of diode 84 is applied to the junction of resistors 61 and 62 which act as part of summing circuit 22 combining such voltages with the output voltages from the noise path circuit 17.

The common junction between resistor 62 and the base of squelch control transistor 63 is connected serially through capacitor 87 and serially, diodes 88 and 89 connected anodes toward capacitor 87 and cathodes toward ground line 39. The common junction between capacitor 87 and the anode of diode 88 is connected to the common junction of resistors 90 and 91, serially connected between the positive voltage supply line 37 and ground line 39. The common junction between resistor 62 and the base of transistor 63 is also connected through resistor 92 to ground line 39. The emitter of squelch control transistor 63 is connected serially through resistor 93 and normally closed switch 94 to ground line 39. Normally closed switch 94 is provided to permit manual disablement of the squelch system circuit 18. The output from the collector of squelch control transistor 63 is connected through the coil 95 of relay 96 to the positive voltage supply line 37. The relay 96 drive connection 97 extends from coil 95 to normally closed contact switch 98, with the switch 98 comprising a gate 14 as shown in the embodiments of FIGURES 1 and 2 in the audio output line 13. This provides a fail-safe squelch gate configuration with the audio output line open for audio signal passage through the normally closed contact relay switch 98 when the relay 96 is de-energized.

Operation of the squelch system circuit 18 is based on voltages developed from two sources of information: the presence of noise, which varies inversely with the degree of modulation (since the radio receivers this squelch system is utilized with would generally include automatic gain control circuitry) and the syllabic rate characteristic of speech. The two voltages developed are applied through summing circuit 22 to the squelch control 26. In the particular receivers employed with this squelch control system, receiver IF passband would cut off, for example, at approximately 7.5 kc., and the noise channel 17 narrow passband or high pass filter 23 is composed of capacitor 41 and coil 42 so chosen as to resonate at approximately 6 kc. Thus, the signal centered at approximately 6,000 c.p.s. passed through the filter 23 into noise channel 17 is signal (predominantly noise) present in the upper portion of the IF passband of the receiver where it is substantially unaffected by normal speech frequencies. The approximately 6 kc. centered (noise) signal near but below the IF passband cut off frequency of the receiver is amplified by noise amplifier 24, including NPN transistors 44 and 50 and then rectified and voltage doubled by the rectifier and voltage doubler 25, including diodes 57 and 58. The resulting D-C output voltage is fed through isolation resistor 61 of summing circuit 22 to vary the D-C voltage applied through resistor 62 of summing circuit 22 to the base of transistor 63 in squelch control circuit 26. When this voltage out of resistor 62, and applied to the base of transistor 63, is at a sufficiently high positive level, the transistor 63 is turned on and relay 96 actuated to open normally closed contact switch 98 of gate 14 thereby providing squelch of the audio output circuit.

In the speech channel or syllabic rate path 16, audio frequencies are amplified by transistor 64. The signal is then rectified and doubled through the diode 70 and diode 71 rectifier and voltage doubler. The resulting D-C is then filtered for audio frequencies by the syllabic rate detector 19, including capacitor 73. The value of capacitor 73 is so chosen that it presents a low impedance to ground line 39 at frequencies above approximately 25 c.p.s. so the signal remaining, passed through capacitor 75 to the base of transistor 76, is substantially at a syllabic rate below 25 c.p.s. and varying in amplitude to the syllabic rate of speech, generally approximately two to ten c.p.s., depending upon the particular speaking voice. This low frequency signal is amplified by transistor 76 and then rectified and doubled by the diode 83 and 84 rectifier and voltage doubler 21 to provide a negative going voltage out of the anode of diode 84. The resultant negative going D-C voltage is applied to the common junction of resistors 61 and 62 of summing circuit 22 and is so combined with voltage input through isolation resistor 61 from the noise path circuit 17 as to generally vary the voltage applied to the base of transistor 63 to bias transistor 63 to cut off. Obviously, when transistor 63 is cut off and stops conducting, relay 96 is de-energized and the audio output circuit is again completed through the reclosed, normally closed relay switch 98.

From the foregoing, it may be seen that with reception of a single sideband audio signal, the decrease in noise due to modulation, combined with the AGC action in the receiver, decreases the positive noise potential developed out of noice circuit path 17 and the effect of such positive potential at the base of transistor 63. It further appears that the voltage potential at the base of transistor 63 is driven still further in a negative voltage direction by the voltage developed out of the anode of diode 84 in the syllabic rate path channel circuit 16. The combined action generally quite effectively biases transistor 63 to cut off, thereby de-energizing relay 96 and re-establishing the audio output through the reclosed, normally closed contact switch 98.

It should be particularly noted that although this squelch system circuitry is particularly designed for operation with a single sideband type receiver, it will also work with AM or FM signal receivers. This is so with the noise quieting action due ot the presence of a carrier signal tending to remove positive bias voltage from the base of transistor 63 even when syllabic rate variations are not present with the carrier signal.

Variable resistor 49 provides for adjustment of the D-C voltage output developed by noise path circuit 17 for proper operation as desired of transistor 63 and setting of the level of squelch operation. Setting position requirements of variable resistor 49 will vary from receiver to receiver depending upon the noise output of particular receivers and the gains of the respective transistors 44 and 50. The diodes 83 and 84 of rectifier and voltage doubler 21 are slightly reverse biased by the voltage divider formed with resistors 85 and 86 between positive voltage supply line 37 and ground line 39 so that the diodes will not conduct when the base of transistor 63 is relatively positive to thereby prevent an unwanted voltage drop across the isolation resistor 61 of summing circuit 22.

Proper operation of any audio controlled gate relies on a circuit having a fast attack time so that the first transmitted word or syllable will not be missed and, a slow release time so that the gate will not close between syllables or words. This is accompished in squelch system circuit 18, as shown in FIGURE 3, in at least two different ways and/or by interaction of various signal developed voltages. First, when the voltage at point A drops substantially to zero in the absence of noise, point B quickly drops to a low value due to the voltage divider action of capacitor 87 discharge current flowing through resistor 91 which has a relatively high resistance value. The positive end of capacitor 87 is blocked from ground by diodes 88 and 89, giving rise to a fast attack time since transistor 63 is quickly cut off. A similar set of conditions exists when the voltage level at point C, the common junction of diode 84 and resistors 61 and 62, goes negative due to a syllabic rate signal over a predetermined power level. Secondly, a particularly important feature of operation with this circuit is that the voltage potential at point C very rapidly drops in a negative going direction, generally to a negative value level with the very first few audio cycles at each start of audio after a period of nonaudio and a squelch condition. This is primarily due to the phasing that exists through the circuitry between the transistors 64 and 76 in spite of the signal normally being amplified through transistor 76 being otherwise, strictly a syllabic rate signal alone.

This very useful action, greatly contributing to a fast attack time in re-establishing the nonsquelched state with the squelch system, comes about as follows: the first few cycles of audio output from transistor 64 with the initial resumption of audio is rectified through the diode 70 and 71 rectifier and voltage doubler to give an immediate resultant rise in voltage at the base of transistor 76. The collector current of transistor 76 increases accordingly and the immediate resulting drop in voltage across resistor 79 is transferred through capacitor 82 and diode 84 to point C. This initial immediate fast acting negative going voltage surge aids in swiftly varying the bias voltage applied at the base of transistor 63 to a transistor cut off level. This provides the desired extremely fast attack time even before the normal syllabic rate voltage output from syllabic rate channel 16 is developed to immediately re-establish the audio output circuit after a period of squelch.

In the absence of audio modulation, the negative syllabic rate voltage output out of the syllabic rate channel 16 disappears and the voltage at point B out of summing circuit 22 again rises due to the noise channel 17 developed voltage output rise at point A due to receiver noise. Voltage across capacitor 87 rises slowly as it charges through resistor 61, resistor 62, and diodes 88 and 89. Since diodes 88 and 89 effectively ground the positive end of capacitor 87, the voltage at the base of transistor 63 must also rise slowly resulting in a relatively long release time to firing of squelch control transistor 63 of squelch control circuit 26 and activation of relay 96 for receiver output squelch in a slow release from audio. It should be noted that resistors 90 and 91 maintain substantially a fixed voltage across diodes 88 and 89, slightly below the conducting level (approximately .95 volt D-C with the diodes used). Since point B is normally operated at a positive 1.3 to 1.4 volts, in such a squelch circuit, the reverse potential across capacitor 87 can never exceed 0.5 volt D-C, a fact advantageously permitting the use of a polar capacitor, and thereby saving space. Generally, the connection of the common junction of resistors 90 and 91 maintains a slight positive potential on capacitor 87 further permitting use of a polarized capacitor materially smaller than a nonpolarized capacitor of the same rating.

With diodes 88 and 89 in series with capacitor 87, as shown, a syllabic rate signal through channel 16 driving point B and the base of transistor 63 negative cannot charge capacitor 87 through the two diodes 88 and 89, but is limited to charging the capacitor through resistor 91. This resistor is of sufficient value to resist quick charging of capacitor 87 and therefore the voltage level of point B drops very rapidly, further insuring a fast attack time in removal of squelch with initiation of audio. During the time that speech is present, capacitor 87 can charge and does charge through resistor 91. Then, as soon as speech is interrupted and point B rises in voltage potential level, as a result of the increased voltage level output at point A of noise channel 17, capacitor 87 is effectively clamped to ground through diodes 88 and 89, tending to hold the voltage substantially at that point during the discharge time of capacitor 87, thereby giving rise to a slow release time and slow activation of transistor 63 to the fired squelch controlled state.

Components and values used in a squelch system circuit having a syllabic rate channel and a noise channel as shown in FIGURE 3, include the following:

| | | |
|---|---|---|
| Capacitor **35** | microfarads | 15 |
| Positive voltage supply **36** | volts | 16 |
| Capacitor **41** | microfarads | .047 |
| Coil **42** | millihenrys | 15 |
| Capacitor **43** | microfarads | 0.22 |
| NPN transistors **44, 50, 63, 65,** and **76** | | 2N2270 |
| Resistor **45** | ohms | 100K |
| Resistor **46** | do | 22K |
| Resistor **47** | do | 2.2K |
| Capacitor **48** | microfarad | 1 |
| Variable resistor **49** | ohms | 1K |
| Resistors **51** and **52** | do | 15K |
| Resistor **53** | do | 1.2K |
| Capacitor **54** | microfarads | 10 |
| Resistor **55** | ohms | 220 |
| Capacitor **56** | microfarads | 2.2 |
| Diodes **57, 58, 70, 71, 83, 84, 88** and **89** | | 1N457 |
| Resistor **59** | ohms | 1.8K |
| Capacitor **60** | microfarads | 2.2 |
| Resistor **61** | ohms | 2.2K |
| Resistor **62** | do | 1.5K |
| Resistor **65** | do | 10K |
| Resistor **66** | do | 270 |
| Resistor **67** | do | 33K |
| Resistor **68** | do | 3.3K |
| Capacitor **69** | microfarads | 15 |
| Resistor **72** | ohms | 2.7K |
| Capacitor **73** | microfarads | 33 |
| Capacitor **75** | do | 150 |
| Resistor **77** | ohms | 6.8K |
| Resistor **78** | do | 15K |
| Resistor **79** | do | 1.8K |
| Capacitor **80** | microfarads | 150 |
| Resistor **81** | ohms | 180 |
| Capacitor **82** | microfarads | 45 |
| Resistor **85** | ohms | 2.2K |
| Resistor **86** | do | 150 |
| Polar capacitor **87** | microfarads | 47 |
| Resistor **90** | ohms | 5.6K |
| Resistor **91** | do | 330 |
| Resistor **92** | do | 33K |
| Resistor **93** | do | 47 |

Thus, it may be seen that this invention provides a very effective squelch system, particularly for an AGC system equipped single sideband receiver, or alternately AM or FM receivers equipped with AGC, operative from two sources of information: the presence of noise, varying inversely with the degree of modulation, and the syllabic rate characteristic of speech. It is a squelch system operating entirely with the two items of information entirely obtainable within the limits of the demodulator IF passband signal passed to the audio output line of the receiver. A squelch circuit syllabic rate channel develops a negative going squelch control voltage from the syllabic rate content of the speech beneath approximately 25 c.p.s., and a noise channel develops positive going voltage for controlling squelch. The noise channel positive going voltage output is developed from signal content in the audio output line passed through a relatively narrow passband or high pass input filter passing frequency content centered near but below the IF passband cut off frequency of the receiver. It is a squelch system having an extremely fast attack in removal of squelch at the start of audio acting through the syllabic rate channel even before a syllabic rate voltage is developed, and still in the squelch output control circuit including circuitry giving relatively slow release from the audio state to the squelched condition of operation.

It should be noted that various or all NPN transistors in the squelch circuit could be replaced by PNP transistors with appropriate circuit adjustments, readily apparent to those skilled in the art, and with such various squelch circuit embodiments providing substantially the same results as with the disclosed squelch circuit. Furthermore, the diodes of various rectifiers and voltage doublers could be reversed, as appropriate, in developing output voltages for desired performance of the respective squelch circuits. For example, with a PNP transistor in place of NPN transistor 63, it may be desirable that the voltage developed by the noise channel 17 be a negative going voltage instead of a positive going voltage and the output of the syllabic rate channel 16 be a positive going voltage instead of a negative going voltage.

Whereas this invention is here illustrated and described with respect to a specific embodiment thereof, it should be realized that various changes may be made without departing from the essential contribution to the art made by the teachings hereof.

I claim:

1. In a radio frequency receiving system having a demodulator IF output to an audio output line, a squelch circuit including: blanking means having input means and being constructed to be responsive to a predetermined squelch circuit derived signal voltage level; a noise channel connected for receiving an input from said audio output line, and including, filter means selectively passing a predetermined selected portion of the demodulator IF output of said radio receiving system; means amplifying the signal content passed through said filter means; rectifying means for developing a D-C output of a predetermined polarity, varying in magnitude with the signal content passed by said filter means and amplified by said means amplifying the signal; and a syllabic rate channel connected for receiving an input from said audio output line, and including, a syllabic rate detector adapted for passing substantially all syllabic varying amplitude signal content beneath a repetition rate of approximately 25 cycles per second contained in the demodulator IF output to said audio output line; syllabic rate sginal amplifying means, and rectifying means connected for amplifying and rectifying the output of the syllabic rate detector; and with said syllabic rate channel rectifier being constructed to develop a D-C output voltage opposite in polarity to the D-C output voltage out of the rectifier of the noise channel; summing circuit means connected for receiving both the noise channel and syllabic rate channel D-C outputs for developing a resulting voltage output applied as an input to a squelch voltage level controlled circuit of said blanking means; with said summing circuit means having a direct connection to said squelch voltage level controlled circuit; with the squelch voltage level controlled circuit including a multielectrode control device with the connection of said summing circuit means being directly to one of the electrodes of said multielectrode control device; voltage bias circuit means for various electrodes of said multielectrode control device; said voltage bias circuit means including, a voltage supply, and a voltage potential reference source; capacitive means and diode means series connected between the direct connection common junction, of said summing circuit means and said multielectrode control device, and said voltage potential reference source; and voltage dividing means having a connection to the common junction of said capacitive means and said diode means wherein said voltage dividing means includes sufficient impedance between said capacitive means and the voltage potential reference source to resist quick charging of the capacitive means when substantially the only charging path is through said impedance means; and said diode means having such cathode-anode orientation as to substantially limit charging of the capacitor to a circuit path including said impedance means when the output of said summing circuit is polarity going in the direction of the polarity output normally derived from syllabic rate signals through said syllabic rate channel.

2. The squelch circuit of claim 1 wherein, when the output of said summing circuit is polarity-going in the direction of polarity output normally derived from said noise channel, a charging path for said capacitive means includes said diode means and impedance means of said summing circuit.

3. The squelch circuit of claim 2 wherein, said syllabic rate detector of the syllabic rate channel includes a multidiode equipped rectifier and voltage doubler having its output connected through a syllabic rate signal passing filter to said syllabic rate signal amplifying means; with the multiple diodes of said multidiode equipped rectifier so cathode-anode oriented that, with the start of audio after a period of nonaudio and a squelch condition, the voltage potential output will very rapidly move in a polarity-going direction toward the normal polarity output with audio derived through the syllabic rate channel in an extremely fast attack time even before the normal syllabic rate voltage output from the syllabic rate channel is developed.

4. The squelch circuit of claim 3 wherein, said syllabic rate signal passing filter includes a capacitor connected between the output of said rectifier and voltage doubler and ground; with the value of the syllabic rate signal passing filter capacitor so chosen that it presents low impedance to ground for frequencies above approximately 25 cycles per second appearing at the output of said rectifier and voltage doubler.

5. The squelch circuit of claim 2 wherein, the rectifying means of the noise channel includes multiple diodes arranged as a rectifier and voltage doubler with cathode-anode orientation providing a noise channel positive polarity going D-C output; and with the syllabic rate channel rectifying means including multiple diodes arranged as a rectifier and voltage doubler with cathode-anode orientation providing a syllabic rate channel negative polarity going D-C output.

6. The squelch circuit of claim 5 wherein, the diode means series connected with said capacitive means between said summing circuit means and said voltage potential reference source includes two series connected diodes with cathode orientation toward said voltage potential reference source; and with said voltage potential reference source being ground.

7. The squelch circuit of claim 1 wherein, said multielectrode control device is a multielectrode solid state device; said syllabic rate signal amplifying means is a multielectrode solid state device; and the means amplifying the output of said filter means in the noise channel includes a multielectrode solid state device.

8. The squelch circuit of claim 7 wherein, said syllabic rate channel includes a multielectrode solid state amplifying means before said syllabic rate detector; and wherein there are multiple solid state multielectrode amplifying devices within said noise channel.

9. The squelch circuit of claim 8 wherein, said multielectrode solid state devices are NPN transistors.

10. The squelch circuit of claim 8 wherein, said blanking means is a normally closed contact relay switch in said audio output line; with the relay switch being part of a relay controlled by firing of said multielectrode control device of said squelch voltage level controlled circuit.

11. The squelch circuit of claim 10 wherein, normally closed switch manual disablement means is provided with the squelch circuit.

12. The squelch circuit of claim 7 wherein, variable impedance channel signal balance adjusting means is provided in one of said channels.

13. The squelch circuit of claim 12 wherein, said variable impedance channel signal balancing adjusting means is a variable resistor located in the noise channel.

14. The squelch circuit of claim 1 wherein, said voltage dividing means so limits the development of reverse potential across said capacitive means as to permit use of a polar capacitor as said capacitive means; and with said capacitive means being a polar capacitor.

References Cited

UNITED STATES PATENTS

| | | | |
|---|---|---|---|
| 2,802,939 | 8/1957 | Klehfoth | 325—478 |
| 3,102,236 | 8/1963 | Eichenberger et al. | 325—478 |

KATHLEEN H. CLAFFY, *Primary Examiner.*

R. LINN, *Assistant Examiner.*